May 27, 1941.   L. G. ELLIS   2,243,729
METHOD FOR ANALYSIS OF SEISMOGRAPHIC RECORDS
Filed Aug. 20, 1938   2 Sheets-Sheet 1
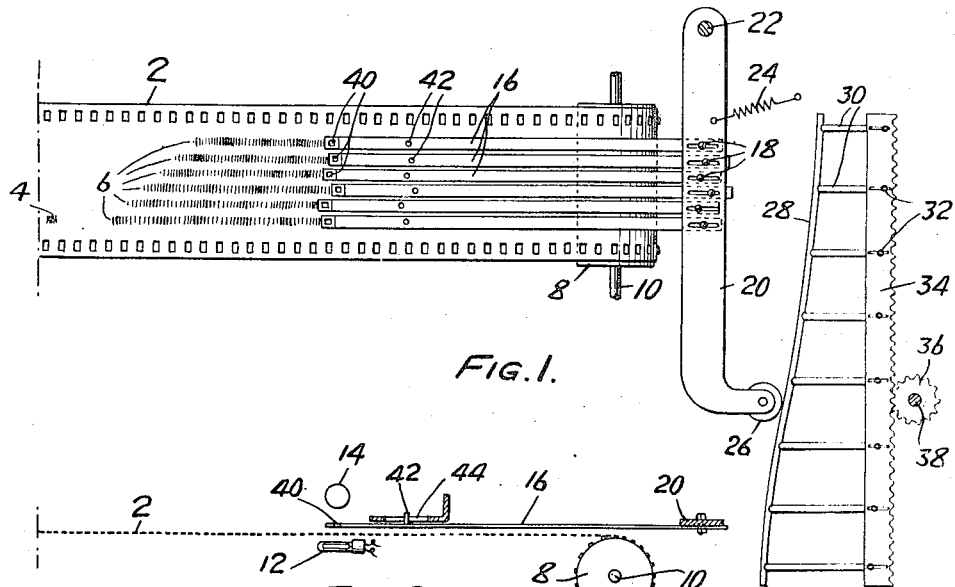
FIG.1.
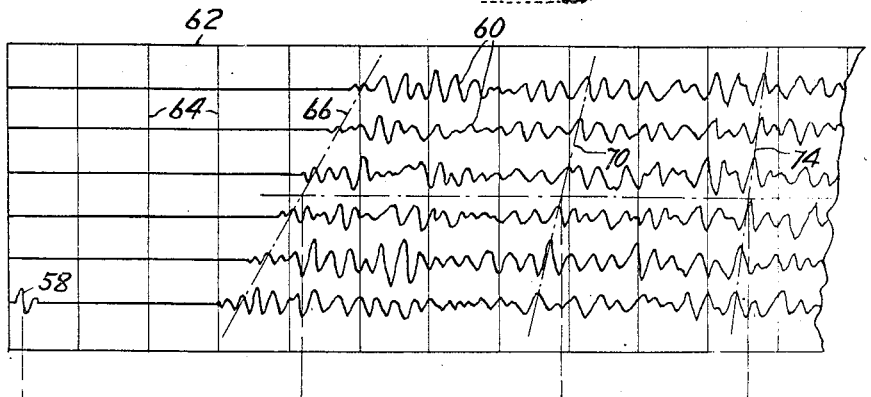
FIG.2.
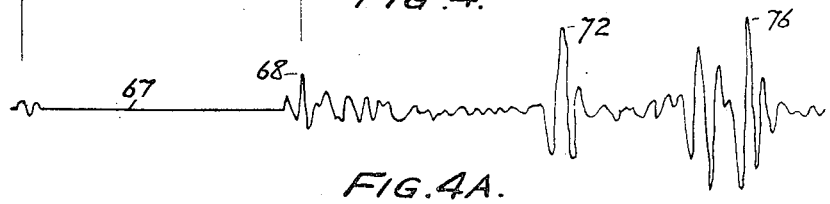
FIG.4.
FIG.4A.
WITNESS:
INVENTOR
Lacoste G. Ellis
BY
ATTORNEYS.

Patented May 27, 1941

2,243,729

UNITED STATES PATENT OFFICE 2,243,729

METHOD FOR ANALYSIS OF SEISMOGRAPHIC RECORDS

Lacoste G. Ellis, Beaumont, Tex., assignor to Sun Oil Company, Philadelphia, Pa., a corporation of New Jersey Application August 20, 1938, Serial No. 225,858

2 Claims. (Cl. 181—0.5)

This invention relates to a method and apparatus for the analysis of seismographic records of the type produced in seismographic prospecting.

As is well known in the art at the present time, the records produced in the method of geophysical exploration known as reflection shooting are difficult to interpret by reason of the fact that the records produced by reflections from various strata are frequently differentiated only slightly, if at all, from the records of waves of more or less indefinite nature which are received simultaneously, such indefinite waves being produced by multiple reflections and more or less sustained vibrations of various strata. In one of the commonest methods of reflection shooting, a series of seismographs are located in line with a shot point at a considerable distance from the shot point, but fairly closely adjacent each other. Under such conditions, the records made simultaneously of the arrivals of waves at different instruments may be expected to show a somewhat later arrival of a reflection at the most distant instrument than the arrival at the instrument nearest the shot. The interval between the two arrivals is usually known as the "step-out" of the arrangement of the detectors. Since there are generally produced a plurality of simultaneous records, there may be usually recognized in all of them some characteristic break or wave of greater magnitude than the majority of waves which are recorded which will be found to be common to several of the traces, at least, and to occur in those traces at intervals corresponding to the normal step-out of the instruments.

In those cases, however, where the strata are not greatly differentiated from each other or are relatively thin, the reflections may well be so completely submerged in the accompanying vibrations that they are very difficult to recognize.

An improved method of picking out reflections which may be used for the basis of interpretations has been evolved which consists of adding the instantaneous amplitudes of a series of corresponding records in a definite fashion. The fashion adopted has been to add to the amplitude at each point of one record that amplitude of a second record produced by the same shot at a receiver more distant from the shot point at an instant later than that of production of the particular amplitude of the first record by an interval corresponding to a certain step-out of the second record, and so on through the series. Such a summation has been made for one step-out for the entire record followed by summations made for other step outs, each for the entire record.

The resulting summed records should show considerable magnification of reflections received at the particular step-outs used for the summation, and by a comparison of the summed records made for a number of step-outs a better identification of reflections can be made. The method just indicated, however, has substantial limitations in several ways. First, local magnifications occur in such fashions that it is sometimes difficult to assign satisfactory interpretations to them. Secondly, the wave shapes are inherently distorted by the method, whereas it would be desirable to know the true wave shapes since additional interpretations may sometimes be made on the basis of them.

It is the object of the present invention to provide a method, and a type of apparatus preferably used for carrying out the method, whereby reflections may be picked out of a series of records and good pictures of the wave shapes of the reflections given with substantial suppression of those portions of the records due to accompanying vibrations of no particular significance. Briefly stated, in accordance with the present invention there is provided a summation of the general type indicated above, but the summation is so carried out that there are summed the instantaneous amplitudes of the records which properly correspond to each other from the standpoint of reflections which should be received at those particular intervals following the shot instant at which the summations are made. Translated into terms of step-outs, the summations are made to correspond to the step-outs which would normally be expected in the reception of reflections at different intervals following the shot. Or, in other words, the summation is made to correspond to varying step-outs as progress along the records takes place.

It is an object of the present invention to provide an apparatus for automatically carrying out the method just indicated, which apparatus is desirable to take into account instrument and surface corrections or the like so as to secure a better picture of the reflections with suppression of any factors which have no bearing thereon.

The above and other objects of the invention will be apparent from the following description, read in conjunction with the accompanying drawings, in which:

Figure 1 is a diagrammatic plan view of an apparatus for the analysis of records in the manner outlined;

Figure 2 is a fragmentary vertical section through the same;

Figure 4 is a diagrammatic view showing a series of records in the form of curves plotted against time by means of the improved apparatus and translated from the variable density photographic records analyzed by the apparatus;

Figure 4A is a similar view showing the type of record resulting from summation in accordance with the invention.

Figure 3:
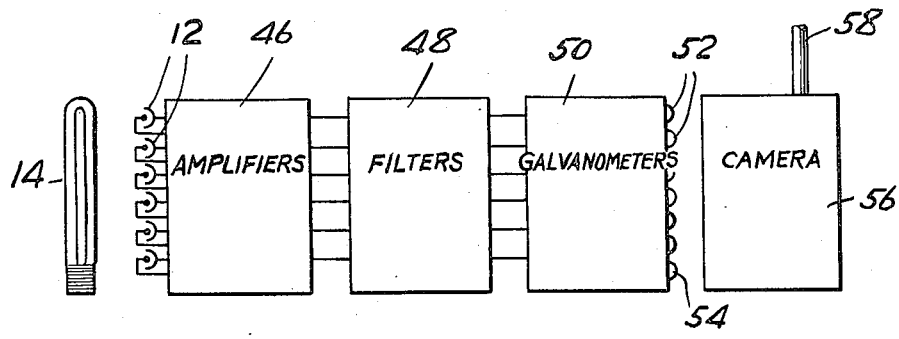
Figure 3 is a wiring diagram illustrating the electrical apparatus associated with the mechanism.

There is illustrated at 2 a photographic film on which there occur variable density track records, including, at 4, the record of the firing of a shot and at 6 the respective records of the vibrations simultaneously produced at a series of recording instruments differently located with respect to the shot point, for example, located in line with the shot point. (It will be obvious hereafter that the invention is adapted for various placements of instruments, though for the sake of simplicity the arrangement of the instruments in a line through the shot point will be generally referred to.) The type of record illustrated in Figure 1 may be of the type described in Rieber Patent No. 2,051,153, dated August 18, 1936. Such record generally contains timing marking (not shown) and the shot instant may be recorded on a separate trace rather than on the same trace with the record of one of the detecting instruments as here illustrated.

Records of the type illustrated in Figure 1 are not directly usable, since it is practically impossible for an observer to recognize changes in density of a track of the type illustrated, or variations in width of a track, if a variable width type of track is produced. Consequently, such records have been scanned in the same general fashion as is employed in the scanning of talking pictures and they have been thereby transformed into records consisting of curves running along time axes as illustrated, for example, in Figure 4. Such curves, produced by recording a moving spot of light from a galvanometer, may be interpreted by those skilled in this art. In general, in the formation of variable track records of either variable density or variable width type, it is generally desirable that selective filtering should not be resorted to in their formation with the result that there are recorded all the vibrations which arrive at the detector. In translating such records into curves, however, suitable filters may be used so as to select from them only desired bands of frequencies which may have significance. Thus a record produced in the original recording apparatus may be leisurely analyzed.

In accordance with the present invention, a variable density or variable width type of record is made on film as illustrated in Figure 1, which film is supported and moved by sprockets, as indicated at 8, driven through the medium of a shaft 10 connected to a suitable motor for moving the film at a substantially constant and suitable speed. Beneath each of the tracks 6 there may be located a photo-electric cell as indicated at 12, while above the tracks there may be located a single bulb such as 14, or a series of individual bulbs each corresponding to one of the record tracks. The showing of this arrangement is purely diagrammatic, and it will be understood that suitable optical systems are used to project the rays properly through the record tracks which are preferably masked not only by the means hereafter described, but additionally, by other means usually adopted in this art to prevent obtaining spurious results.

Extending lengthwise of the direction of movement of the film is a series of bars 16 pivoted on studs 18 which may be adjustably positioned on slots extending transversely of a lever 20 which is pivoted at 22 to a fixed support and has a roller 26 on its outer end urged by a spring 24 into rolling engagement with a track 28 of a predetermined form. This track 28 is preferably provided by a flexible metallic strip secured to the ends of the rods 30, which may be adjustable to varying extents laterally of a rack 34 by means of adjustable clamping devices indicated at 32. The rack 34, suitably guided for movement in the direction of its length, is arranged to be driven by means of pinion 36 carried by a shaft 38, which is driven in definite time relationship with the shaft 10.

Each of the bars 16 is provided at its end located between the lamp 14 and one of the photocells 12 with a mask portion provided with an aperture 40 aligned with a corresponding track 6. To maintain alignment of the bars with their respective tracks there are provided pins 42 on the bars guided in slots 44 in a fixed member.

In Figure 3 there is illustrated a wiring diagram of the electrical portions of the apparatus. The various photoelectric cells 12 are connected to individual amplifiers indicated at 46 and the outputs of these amplifiers are fed through individual filters 48 and thence to individual galvanometers 50, which may be of the usual types designed to project points of light through lens systems 52 and 54 upon a moving sensitized sheet contained in a camera 56, the sheet being driven by means of a shaft 58 in synchronism with the shafts 10 and 38.

As indicated diagrammatically in Figure 3, it being understood that any suitable detailed wiring arrangements may be employed, the responses of the six individual photocells which are shown are adapted to be transmitted to the camera to produce six graphs of the type illustrated in the upper portion of Figure 4. Additionally, there is provided a galvanometer which, through the optical system indicated at 54, will project upon a sensitized sheet, either simultaneously with or separately from that sheet on which the individual traces are produced, a record of a special summation of the various traces 6. While separate photocells have been illustrated, for the various traces 6, these are not necessary if the summation alone is to be recorded, and in the latter case a single photocell may be arranged to receive the sum of the intensities transmitted by the traces. Such a single photocell gives a summed output equivalent to having a series of individual photocells connected in parallel. If the outputs of the individual photocells are amplified before association, the desired summation may be effected by joining in series the amplified outputs if they occur as electromotive forces, or by joining them in parallel if they occur as currents. The particular result, which may be secured in various ways, is the summation of the amplitudes of the traces in the special fashion outlined below.

Reference was made to the individual adjustments at 18 of the bars 16. Assuming that the portions of the traces 6 which are aligned transversely of the film were simultaneously produced without disturbing influences, then for the production of a number of readable records for comparison of the various traces, it would be generally desirable to scan those portions of the traces lined up transversely of the film and set the results down with vertical alignment meaning simultaneity. However, tests may well illustrate that local conditions at one or more of the recording instruments may be different so that if it were not for some surface conditions of the ground or some lag in response of the instrument, a particular wave might be recorded by the instrument either before or after actual recording takes place. By noting to what extent the actual recording leads or lags the theoretical recording, the interpretation of the traces may be corrected for such factors by displacing the various openings 40 lengthwise of the film, and it is for this purpose that the varying adjustments at 18 are provided. Such adjustments, which are very much exaggerated in Figure 1 for the purpose of illustration, are such that the various apertures 40 are simultaneously in alignment, when the lever 20 extends at right angles to the direction of motion of the film, with the portions of the traces 6 which would have been made simultaneously if it were not for disturbing influences.

If under such conditions the rack 34 is not moved and the lever 20 is held in a position so that theoretically simultaneously made portions of the traces are simultaneously scanned, the record of Figure 4 will be made in the camera. This record is of conventional type and has on it an indication 58 of the instant of firing of the shot and separate curves as indicated at 60 corresponding in their varying amplitudes to the variations in density or width of the track 6. Timing markings 64 may be superimposed in the usual fashion, generally under control of a timing trace (not illustrated) on the original record 2. The curves 60 so produced may have been subjected to selective filtering with the idea of accentuating those portions of them corresponding to reflections which it is desired to note.

The curves illustrated at 60 are typical of those produced when reflections are relatively weak. It will be noted that each of them alone would be quite uninterpretable from the standpoint of detecting reflections. As a matter of fact, considering the actual analysis which will be described hereafter, those characteristics which represent reflections are in many cases considerably less evident than characteristics which fail to represent anything of interest.

Figure 5:
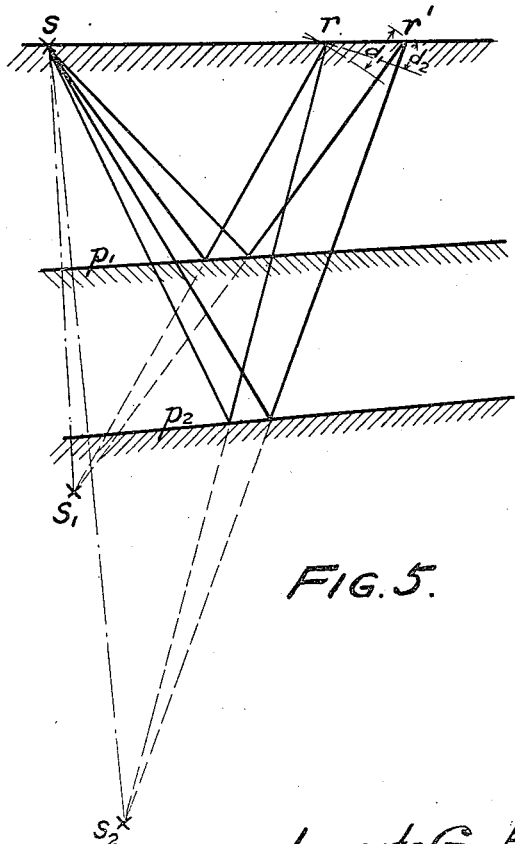
Figure 5 is a diagram showing in conventionalized fashion the reflection paths of waves and illustrating the principle of the present invention.

Referring now to Figure 5, there is illustrated therein in diagrammatic and idealized fashion the nature of the step-out which is commonly considered in seismographic work. A shot point is illustrated at $s$ on the surface of the ground and there are illustrated two reflecting boundaries $p_1$ and $p_2$ at different depths from which waves are reflected along the paths indicated in full lines to detectors at $r$ and $r'$, which are shown as located in a line through the shot point, but spaced different distances therefrom. The construction of the rays followed by the waves (assuming that they are straight for illustrative purposes) will be apparent from the drawings, in which $s_1$ and $s_2$ represent the images of the shot point respectively due to the reflecting boundaries $p_1$ and $p_2$. The lengths of the paths of the waves passing to $r$ and $r'$ by way of the two boundaries are then respectively given by the distances of these points $r$ and $r'$ from the images $s_1$ and $s_2$ as centers. It will be seen that the path of a wave to $r'$ by way of reflection from $p_1$ is greater than the path to $r$ by a distance $d_1$, while in the case of reflection from the boundary $p_2$ the difference in path is $d_2$, which is substantially less. Since the paths are not coincident the difference in travel times to $r$ and $r'$ will not be the time required for the disturbance to travel the distances $d_1$ and $d_2$ at the velocity adjacent the surface, but the difference in travel time between arrivals at $r$ and $r'$ by way of boundary $p_1$ will be approximately given by $d_1$ divided by the average velocity for the whole path, and similarly for the reflection from $p_2$.

The extra time required for the passage of a wave from the source via $p_1$ to $r'$ over that required to $r$ is known as the step-out for a reflection from the boundary $p_1$ for the spacing of the detectors $r$ and $r'$. Obviously the step-out for boundary $p_2$ for the same spacing of the detectors is less than for $p_1$, and the step-out becomes less as the depth of the reflecting boundary becomes greater.

Assuming that the lower curve 60 of Figure 4 was made by an instrument located at $r$, and the upper curve by an instrument located at $r'$, it will be obvious that the step-out for the first arrival, a refracted wave, will correspond roughly to the time required for passage through a distance approximately that of the spacing of $r$ and $r'$. If a line such as 66 is drawn as illustrated so as to intersect the top and bottom curves on the record 62, at times differing by the normal step-out for the first arrival, and assuming that the four intermediate instruments were evenly spaced between the instruments $r$ and $r'$, it will be obvious that the amplitudes of these curves corresponding to the effects of the first arrival should add up along the lines 66 whereas any random vibrations due to other causes might well be expected to balance out in the case of six curves such as those recorded, this expectation increasing, of course, with the number of curves recorded. That this is true is illustrated by the peak 68 in the curve 67 in Figure 4A, which peak 68 represents the algebraic summation of the amplitudes along the line 66, the slope of which corresponds to the step-out of the initial onset.

If the depth of a boundary $p_1$ was known, there could be theoretically determined, having as preliminary information the velocities at various depths normal to the region, the approximate time of arrival of reflections from that boundary at the instruments and also the normal step-out for that boundary and the instrument spacing. Suppose, therefore, there is drawn a line 70 which intersects the lowermost curve 60 at the time of expected arrival of a reflection at the nearest receiver $r$ from the boundary $p_1$ and which has a slope such that the time interval between its intersection with the lower curve and the upper curve is the expected step-out for the boundary $p_1$. Then if the amplitudes of the curves 60 were summed along the line 70, the expected result would be a considerable magnification of a reflection from the boundary $p_1$ as contrasted with the summation of any other disturbances in the curves 60 at the points of intersection. 72 illustrates the algebraic summation of the amplitudes along the line 70. It will be noted that whereas there do not appear to be any very pronounced peaks in the individual traces, the summation along the line 70 results in a very considerable wave at 72 as compared with summations along lines generally parallel to 70, but to the right and left thereof.

The same condition is illustrated for the boundary $p_2$ at 74, which line has a slope corresponding to the normal step-out for the boundary $p_2$. Again summation shows a considerable reflection at 76.

It will be clear from the above that if there are summed simultaneously the portions of the traces 6 which differ in time in a fashion corresponding to the normal step-out for the particular instrument spacings used and for the time interval following the shot which would determine the approximate depth of a boundary at which reflection took place, the resulting record would be of the type illustrated at 67 in Figure 4A, in which reflections would be highly magnified, as indicated at 72 and 76, as contrasted with more or less random disturbances. Such scanning results if, during the progress of the film 2 past the apertures 40 the lever 20 is caused to be tilted to a proper extend predetermined by a suitable arrangement of the track 28 as the track 28 moves with respect to the roller 26 in synchronism with the film movement. It is thus that the record of Figure 4A is produced as the summation of the various traces 6, any amplitude in this figure corresponding to the summation along a line, such as 66, 70 and 74, of which the center is directly thereabove in Figure 4. Briefly stated, the final record 67 shows variations with respect to time of the algebraic sum of the instantaneous amplitude values of the plurality of records which correspond in time differences of their formation, for the particular time of their formation after the occurrence of the disturbance at the source, to the expected time differences between the reception of corresponding reflections at said various points so that corresponding reflection records will be selectively magnified in the composite record as compared with other records of vibrations.

In carrying out the method, it will generally be found desirable to produce the type of record indicated at 62 showing translated into curves such as 60 the variable densities or widths of the various tracks 6. There will also be known, as is usual in reflection work, the velocities at various depths in the region under consideration and tests will have been made of the instruments to determine local conditions which might affect their responses. For the instrument arrangements used and the various depths, the travelling times of the reflections and the normal step-outs can be calculated. Or, alternatively, if well defined reflections appear on a record such as that of Fig. 4, the normal step-outs may be directly measured. Adjustments are then made at 18 to take account of surface or instrument corrections, and the track at 28 is so shaped that, as scanning takes place, the slope of the lever 20 will be changed to correspond to the variations in step-out. By scanning with a series of photocells 12 connected in such fashion that their responses are algebraically added or, by the use of a single photocell or equivalent arrangement, as indicated above, a record will be produced in the camera similar to that illustrated 67 in the lower portion of Figure 4. In this record the reflections are very much magnified as contrasted with the records of other vibrations. In effecting the summation, it will generally be desirable to further accentuate the reflections by the choice of filters which experience will have shown will selectively pass the frequencies characteristic of reflections in the region. The speed of feed of the film must be such as to make the filters properly operative. For example, if scanning takes place at the speed of formation of the record, then the filters may be such as to pass those frequencies which actually existed and which were characteristic of the reflections. On the other hand, if scanning is at a different rate, the filters must be designed accordingly. Selective filtration may be accomplished with a single set of filters if different speeds of scanning are used.

By providing the continuous variations in summation corresponding to the changes of step-out a truer picture of the reflected wave formations may be obtained than by any method heretofore devised.

What I claim and desire to protect by Letters Patent is:

1. The method of seismographic survey comprising creating at a localized source a disturbance in the earth, producing simultaneous variable amplitude records with respect to time, side by side on a strip member, of the vibrations resulting from said disturbance at a plurality of points differently located relative to said source in such fashion that portions of the records aligned transversely of the strip are simultaneously formed, and producing a record showing variations with respect to time of the algebraic sum of the instantaneous amplitude values of said records which were produced at predetermined time relationships varying with respect to the time of their production after the occurrence of the disturbance at the source, said composite record being formed by variably scanning portions of the records not aligned in the fashion of simultaneously formed portions of the records.

2. The method of seismographic survey comprising creating at a localized source a disturbance in the earth, producing simultaneous variable amplitude records with respect to time, side by side on a strip member, of the vibrations resulting from said disturbance at a plurality of points differently located relative to said source in such fashion that portions of the records aligned transversely of the strip are simultaneously formed, and producing a record showing variations with respect to time of the algebraic sum of the instantaneous amplitude values of said records which correspond in predetermined time differences with respect to the time of their occurrence after the occurrence of the disturbance at the source, said composite record being formed by variably scanning portions of the records by means of scanning devices for the various records having variable relationship transverse to the strip during the formation of the composite record.

LACOSTE G. ELLIS.